United States Patent [19]

DeLeo et al.

[11] 4,378,697

[45] Apr. 5, 1983

[54] STRUT MOUNTED MULTIPLE STATIC TUBE

[75] Inventors: Richard V. DeLeo, Hopkins; Floyd W. Hagen, Eden Prairie, both of Minn.

[73] Assignee: Rosemount Inc., Eden Prairie, Minn.

[21] Appl. No.: 280,860

[22] Filed: Jul. 6, 1981

[51] Int. Cl.³ ............................................. G01P 5/165
[52] U.S. Cl. ............................... 73/182; 73/861.65
[58] Field of Search .............. 73/182, 861.65, 861.66, 73/861.67, 861.68

[56] References Cited

U.S. PATENT DOCUMENTS

| | | | |
|---|---|---|---|
| 3,318,146 | 5/1967 | DeLeo et al. | 73/180 |
| 3,482,445 | 12/1969 | DeLeo et al. | 73/182 |
| 3,585,859 | 6/1971 | DeLeo et al. | 73/388 |
| 4,096,744 | 6/1978 | DeLeo et al. | 73/180 |

*Primary Examiner*—Donald O. Woodiel

*Attorney, Agent, or Firm*—Kinney, Lange, Braddock, Westman and Fairbairn

[57] ABSTRACT

A strut mounted multiple static tube providing, as shown, multiple separate static pressure measuring systems and using one probe with separate sets of pressure sensing ports for each system. The probe is designed to have a surface configuration which provides substantially identical static pressure conditions at each set of sensing ports while the axial length of the barrel portion of the sensing probe is maintained at a minimum and the pressure effects from the adjacent structures such as the strut are compensated for. The structure includes a barrel portion of the probe having a surface annular wave pattern with sections of different diameters which causes large, uniform changes in the pressure pattern along the probe to provide areas of both positive and negative pressure levels for aerodynamic compensation. The positions for the ports for the separate systems are selected from a pressure profile of the probe so the ports are located at desired pressure areas.

15 Claims, 7 Drawing Figures

STRUT MOUNTED MULTIPLE STATIC TUBE

BACKGROUND OF THE INVENTION

1. Field of the Invention

The present invention relates to multiple static pressure measuring systems using one external, strut mounted probe.

2. Description of the Prior Art

Various types of compensated dual static tubes have been utilized wherein dual pressure sensing ports are used so that redundancy of compensated static pressure from the remote instrument is established. U.S. Pat. No. 3,482,445 describes a strut mounted dual static tube. It is designed to provide two pressure outputs of equal level magnitude. A tapered transition surface section is used to provide the desired change in pressure along the tube.

Typically, one static line is used for operating the pilot's primary instruments such as an airspeed indicator, an altimeter, a rate of climb indicator and a Mach meter. The same instruments in the co-pilot's secondary system are connected to the second static line. Air data computers, autopilots, flight recorders and the like are sometimes also connected into the pilot's and/or co-pilot's static pressure systems or they could require a third or fourth static system on the aircraft. Some aircraft require up to six static tubes to provide the required pressure outputs with the necessary redundancy.

In any probe the position of the static pressure port on the probe has a bearing upon the measured pressure relative to actual pressure. Any error due to pressure disturbances near the aircraft must be compensated for either by the tube itself, or in the instruments or a computer, to relate the measured pressure to the true static pressure. The compensation problems are multipled when a strut is used for mounting the probe because of the airflow and pressure patterns around the strut itself, which disrupt the normal measured static pressure. The pressure pattern around the strut varies greatly with different speeds of the aircraft and different atmospheric conditions.

If the probes could be greatly elongated, the problems would be simplified because the pressure pattern would stabilize. However, the lengths necessary to get a stable pressure pattern so that two spaced apart static pressure ports will sense the same measured static pressure is greater than that desirable or permissible for probes which are mounted on the fuselage or aircraft.

The requirement thus is for a short strut-mounted probe which has multiple sets of static pressure sensing ports and wherein each set of ports measures the same pressure. An additional requirement is that the ports measure a pressure which has a known and selectable relation to the local static pressure at the probe location. For some applications, especially on helicopters and small commuter aircraft, there is a need for much higher pressure levels, both positive and negative, than can be obtained from the design described in U.S. Pat. No. 3,482,445.

SUMMARY OF THE INVENTION

The present invention relates to a strut mounted probe that is short enough to meet design criteria from a physical standpoint and yet is made to provide multiple separate static pressure sensing chambers which will give matched, large, positive or negative pressure measurements, within allowable limits. The probe includes a tubular barrel section having a corrugated (or wavy or undulating) surface formed with annular corrugations. The barrel has different cross sectional dimensions which, when viewed in longitudinal section, appear in the form of a wave on the exterior surface, as shown, with two major annular peaks and two major annular valleys or constrictions. The corrugations will disrupt the flow along the probe surface providing regions of increasing and decreasing pressure levels and in cooperation with the strut providing at least two locations having identical pressures or pressures at a desired relationship. The pressure pattern is varied so that by positioning the ports in preselected locations as shown the ports will measure identical pressure having a known relation to the local static pressure, and by keeping the slopes of the tangent to the surfaces of the corrugations at a low angle to flow direction, the effect of changes in speed of an aircraft on the measured static pressure can also be held to a minimum.

DETAILED DESCRIPTION OF THE PREFERRED EMBODIMENTS

Figure 1:
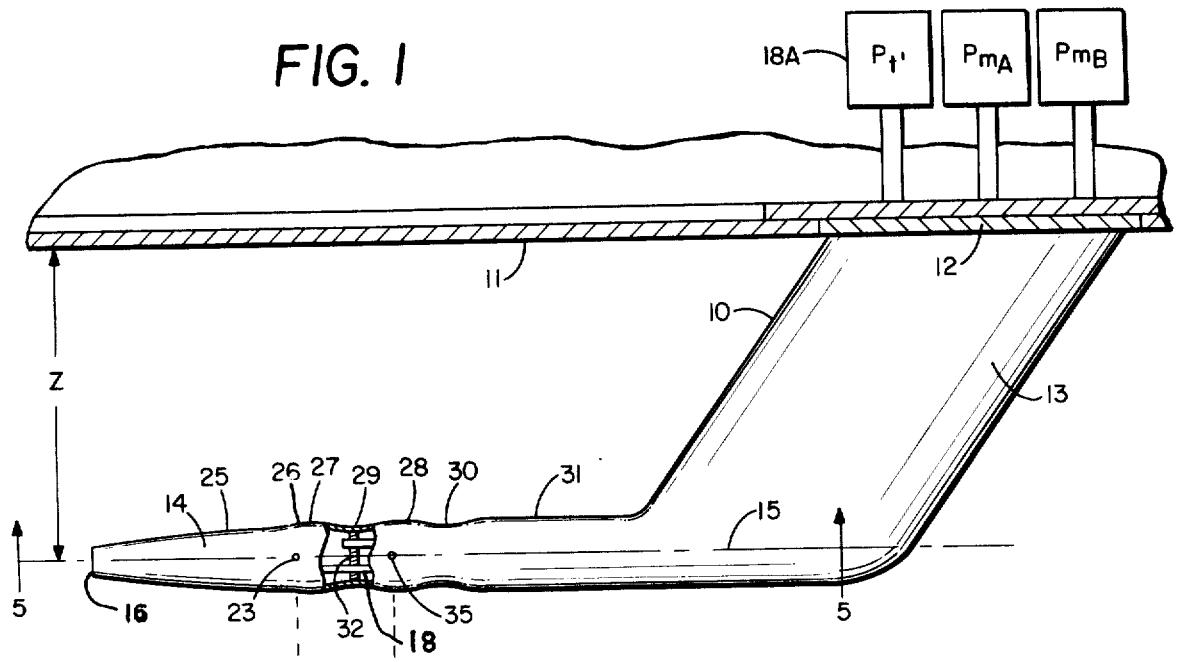
FIG. 1 is a top plan view of a probe made according to the present invention and installed on a portion of an aircraft.

In FIG. 1, a pressure sensing probe is illustrated generally at 10 and is mounted onto portions of a fuselage 11 of an aircraft with suitable mounting means and has a base member 12 that is used to support a laterally outwardly extending strut 13. Though strut 13 as shown laterally supports the probe, and is commonly called an "L" type probe, a boom type mount or other mounting means will work equally as well with this invention. A tubular probe barrel portion 14 is integral with an outer end of the strut 13 and has a longitudinal axis 15 oriented in a predetermined position with respect to the normal axis of flight of the aircraft.

The strut 13 is streamlined to minimize drag effect, and it is made so that it will space the barrel portion 14 a predetermined distance "Z" from the side of the fuselage 11 so that the barrel is out of the influence of the boundary layer of air on the fuselage.

Figure 5:
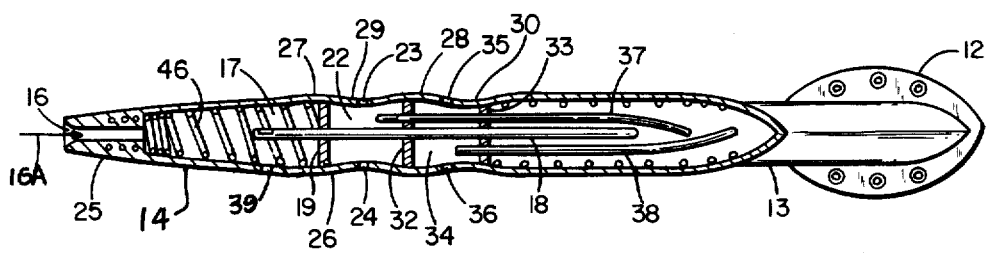
FIG. 5 is a sectional view taken as on line 5—5 in FIG. 1.

The probe shown is a combination pitot-static sensing probe, and referring to FIG. 5, it can be seen that the forward end of the barrel portion has a port 16 which faces forwardly and senses the impact pressure, indicated by an arrow 16A, on the probe. The port 16 opens into a chamber 17 from which a pitot or impact pressure tube 18 extends. The end of the tube 18 in chamber 17 is closed but the tube has an opening in its sidewall, near the end, to sense pressure. The tube 18 is suitably connected to suitable instruments 18A which may be read-out, processing, or computing devices in the aircraft. A bulkhead 19 on the interior of the barrel portion 14 separates the chamber 17 from a first static pressure sensing chamber 22 which is open to atmosphere through a pair of static sensing ports 23 and 24, as shown diametrically opposed and on the top and bottom of the barrel. The axes of ports 23 and 24 are on the same radial plane normal to axis 15. Both ports 23 and 24 open into the chamber 22. An electrical deicing heater 46 is shown on the interior surface of the probe. A drain hole 39 is provided for moisture exhaust from chamber 17.

As shown, barrel portion 14 has a forward external taper portion 25 which is of conventional design, and which blends into the first corrugated (or wavy, or undulating) wall portion 26 in which the ports 23 and 24 are defined. Usually, the pitot-static probe barrels are of uniform, increasing or decreasing diameter back to the mounting strut. However, in the present invention, a double annular corrugation or wave with two major annular peaks 27 and 28 and two major annular valleys 29 and 30 is formed in the probe wall between the forward external taper portion 25 and an aft cylindrical surface portion 31, which is in turn attached to the strut 13. The two corrugation or wave pattern between the forward taper portion 25 and the aft cylindrical surface 31 forms a transition section between these two probe portions that is a smooth, streamlined shape. The diameters of peaks 27 and 28 are substantially equal to the diameter of cylindrical section 31, as shown.

Figure 3:
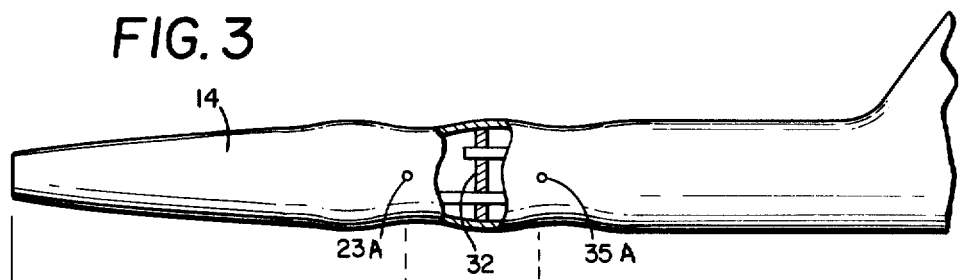
FIG. 3 is a top view similar to FIG. 1 showing a broken away section of the probe with two sets of pressure ports, each located in a positive pressure region of the probe.

A second bulkhead 32 is positioned in the barrel portion 14 of the probe to seal off chamber 22. In FIG. 1 bulkhead 32 is also shown in the cut away between two negative pressure regions on the probe. An alternate location for bulkhead 32 is shifted slightly aft as shown in FIG. 3 between two positive pressure regions on the probe. A third bulkhead 33 as shown is spaced rearwardly from second bulkhead 32 to define a second static pressure chamber 34. The second static chamber 34 is completely pressure isolated from the chamber 22. Third and fourth static pressure sensing ports 35 and 36 are defined through the wall of the barrel portion 14 and open into the chamber 34. The ports 35 and 36 are also, as shown, diametrically opposed and are in line with the ports 23 and 24 but are spaced axially along the probe therefrom. A first static pressure sensing line or tube 37 leads from chamber 22 to suitable instruments in the aircraft, and a second static pressure line 38 leads from the chamber 34.

While the chamber 34 is shown as defined with a third bulkhead, the chamber 34 could extend all the way to the back end of the probe and actually up into the strut if desired before the bulkhead is provided. The chamber 34, however, is sealed from the chamber 22 by the bulkhead 32. In a normal right cylindrical strut mounted probe barrel portion, merely positioning two sets of static pressure sensing ports axially along the length thereof to obtain a dual system is not possible because with just a single diameter cylindrical surface, the sensed pressure at the two ports will differ because of the disturbances caused locally on the sets of ports by the strut 13 or by the aircraft.

Figure 2:
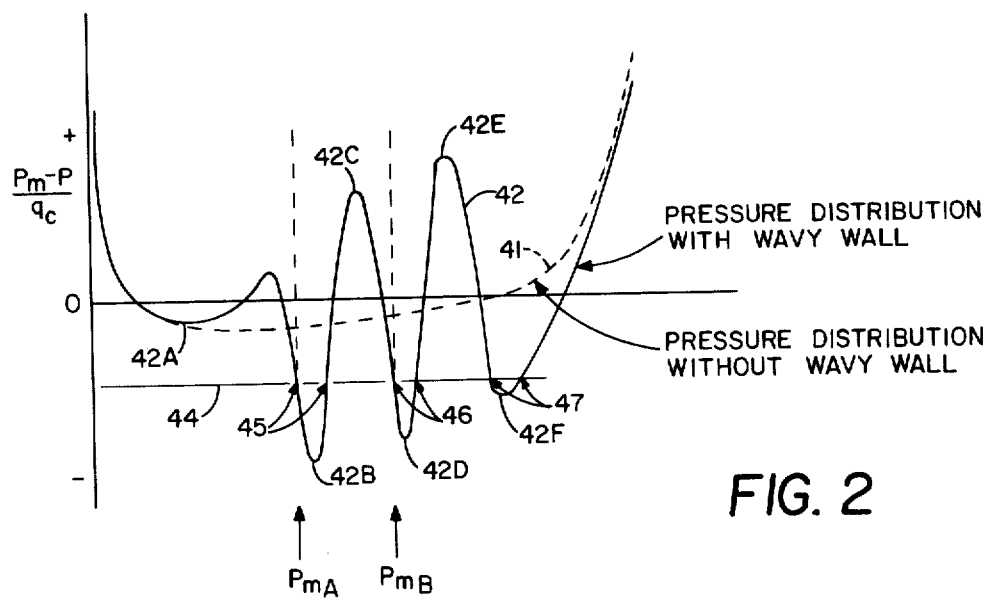
FIG. 2 is a graphical representation of a normalized pressure pattern plotted in relation to the length of a probe, and specifically related to pressure ports in the negative pressure regions of the probe in FIG. 1.

In FIG. 2, there are two curves presented which show the plotting of a normalized pressure function $(p_m-p)/q_c$ wherein $p_m$ is the measured static pressure, p is the local static pressure, and $q_c$ is the pitot pressure minus the local static pressure. This normalized pressure function is a common factor used as a basis of comparison of pressure. The plot along the X axis is related to the length of the probe in FIG. 1 as shown. The Y axis shows static pressure compensation level, both plus and minus. Note that if $p_m$ equals p, there is no pressure compensation. The first curve 41 shown as a dotted line, shows pressure error distribution along a probe having a right cylindrical barrel portion 14 extending at the same diameter all of the way back to the strut 13. The solid curve 42 is the pressure distribution along a probe constructed as shown in FIG. 1 and is related specifically to FIG. 1 by the dashed lines extending from the static ports 23 and 35. The curve 42 gives the pressure profile of the probe and can be obtained by wind tunnel tests. The influence of the strut is to increase the pressure level of the curve 42 as the distance to the strut is decreased. This can be seen at the last positive rise in the pressure curve nearest the strut 13.

Referring to curve 42 it can be seen that the pressure function on the Y axis which is dimensionless and normalized, becomes a minus quantity (first negative pressure valley 42A) along the probe in the tapered forward portion 25. A second negative pressure valley 42B corresponds to the first corrugation peak 27 or point of maximum diameter on the probe surface annular corrugation form. The pressure then rises rapidly to a positive pressure peak 42C that corresponds to the first major annular valley 29 in the probe surface annular corrugation form. The pressure then decreases rapidly to a second negative pressure valley 42D that corresponds to the second peak 28 of the probe surface annular corrugation form. The pressure then returns to a positive pressure peak 42E at the second valley 30 in the probe surface annular corrugation form. The pressure then decreases aft of this second probe surface valley to a negative pressure valley 42F as shown in FIG. 2. On the aft cylindrical portion 31, the pressure rises substantially in the areas ahead of and approaching the strut as shown on the right hand end of the curve 42.

Any static port has to be located at some distance back from the leading edge of the probe, where the probe also has a pitot sensing port, because of the relative uncertainty and changeability of the pressure field adjacent the edge of the port 16 at the leading end or nose of the probe, and also because of the adverse effect of the pitot chamber drain hole 39 on the rearward sensing ports. Air and moisture flowing from hole 39 can be a problem if adequate space is not provided. Further, as is well known, the fluid flow field and thus the pressure field around the strut is not as reliable as that obtained midway along the barrel portion of the probe. Therefore, the static pressure ports should be located remote from the nose or leading end of a pitot-static probe and also as remote from the strut as possible.

If the probe senses only static pressures (there is no pitot port), the nose or leading end does not present as much of a problem, but the strut and other adjacent structures still do. If separately connected static ports were to be located in a normal right cylindrical strut mounted probe, and the ports were to measure the same pressures, it can be seen from the pressure profile curve 41 of FIG. 2, which represents the pressure profile of such a probe, that one set of ports would have to be placed closely adjacent the nose and the other set would have to be adjacent the strut. The range of static pressure compensation level change is very limited over the usable center portion of the probe. The static pressure measurements near the nose and near the strut cannot be depended upon because of the variations in the pressure field at the nose and at the strut. This is further illustrated in FIG. 2 by the relatively low rate of change of curve 41 at these points as opposed to the relatively high rates of change between peaks 42C, 42E and between peaks 42B, 42D, 42F of curve 42. The static ports for separate static pressure sensing systems must also be spaced axially along the probe because if a remote line in a pressurized area of the aircraft fails there will be a reverse flow (out of the port) which will affect the sensed pressure at the ports for the other static system.

The corrugated (or wavy) wall surface changes the pressure distribution or profile on a short probe to give reliable multiple pressures sensing capability. This corrugated wall surface causes a pressure field disturbance ahead of the strut which is predictable and reliable. The pressure pattern or profile plot of curve 42 shows that on the first probe surface annular corrugation or wave peak 27 behind the external taper portion 25, the pressure error reaches the negative pressure valley 42B due to accelerating flow along the tapered surface. The pressure error goes back toward the positive side and then reaches the positive pressure peak 42C in the area of the first probe surface annular corrugation valley 29 due to decelerating flow across the annular valley. Accelerating, then decelerating, flow occurs a second time as the flow passes over the second probe surface annular corrugation (or wave) peak 28 and the second annular corrugation valley 30.

The minimum axial (probe axis) spacing between the static ports for the two separated static pressure chambers is about 0.300 inch. Preferably the spacing is at least 0.500 inch to allow for good mechanical design and to minimize disturbance of one port on the other in presence of a leak in one static system.

The criteria becomes difficult. One must keep the probe short (probably 4 inches minimum to 12 inches maximum) although other dimensions can also be used (it is observed that probe length and weight considerations are important to fuel consumption considerations of air vehicles, however the advantages of shorter lengths and reduced weights with additional static information is quite advantageous); keep the first static ports off the tapered forward portion of the probe because of unreliability of the pressure field close to the leading end of the probe; keep the second static ports out of the pressure influence immediately adjacent the strut because of the unreliability of the pressure field there; keep the ports for the two systems preferably 0.500 inch apart in axial direction; and make sure that the two sets of static pressure sensing ports sense the same pressure. Thus, balancing between the positionings of the separate static ports must be obtained. To select this position a line 44, which is parallel to and on the negative compensating side of the zero line of the plot in FIG. 2, is drawn and the static ports may be located (centered) where line 44 intersects the curve 42 in several different positions. Two of these intersections 45 are on the pressure valley caused by the first probe surface wave peak 27 and two other intersections 46 are on the pressure valley caused by the second probe surface wave peak 28.

By selecting the first intersection on each negative pressure valley (indicated as $P_{mA}$ and $P_{mB}$ on FIG. 2) it can be seen that the pressure pattern is such that the pressure sensed at ports located on the probe along diametral planes passing through the probe and at a location corresponding to the intersections 45 and 46 of line 44 with the curve 42 the pressures at the port sets on the probe will be equal. Thus, ports 23 on the first surface wave leading to wave peak 27 and ports 35 on the second surface wave leading to wave peak 28 will be equal. Either the forward or aft pressure intersection on curve 42 could be used at each negative pressure valley. Actually the pressure at any of these locations can be used by merely placing separate bulkheads inside the probe to separate or isolate each set of pressure ports. Fifth and sixth negative pressures could also be obtained if desired at the intersections with curve 42 and line 44 that occur at 47, just ahead of and on the leading portion of the aft cylindrical surface section 31.

Figure 4:
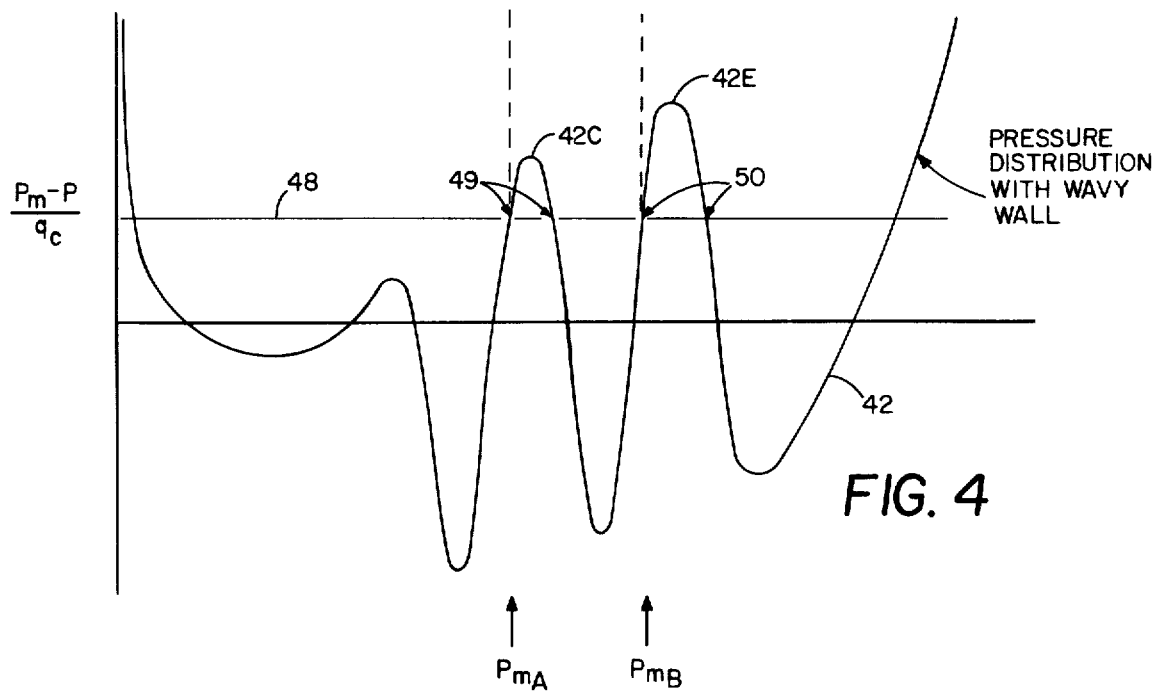
FIG. 4 is a graphical representation of the same pressure pattern shown in FIG. 2 with two positive pressure areas identified that relate specifically to the two pressure ports shown in FIG. 3.

Either negative or positive compensation might be needed to compensate for the local pressure field disturbance induced by the aircraft structure. As shown in FIGS. 3 and 4 positive compensation pressures can be obtained in the pressure areas indicated by the two pressure curve peaks 42C and 42E. The horizontal line 48 in FIG. 4 provides the location of such ports 23A and 35A on the probe section shown in FIG. 3. The forward or leading port location in each annular surface valley on the probe is shown in FIG. 3 for matching positive pressure levels 49 and 50 (also indicated as $P_{mA}$ and $P_{mB}$ on FIG. 4). The aft intersection of line 48 at each side of each positive pressure peak (42C and 42E) of curve 42 could also be used, or all four equal positive pressure locations 49, 50 shown in FIG. 4 could be used if bulkheads are placed between each set of pressure ports on the probe to isolate the respective sets of ports from each other. If desired, each set of static ports could also be in different, but known, pressure error positions.

There are many axial locations along the axial length of the probe barrel in which two sets of static ports can be positioned, and this is shown merely by changing the position of line 44 in FIG. 2 and line 48 in FIG. 4 with respect to the zero line and using these positions on the probe for the fore and aft location of the axes of the ports leading into the respective static chambers. FIGS. 2 and 4 show two examples. By using a pressure profile curve in connection with the outside shape of the static tube, the selection of the position of the static ports becomes easy. It is also recognized that static pressures with different corrections can be taken from the same probe by selecting static port positions which have different but known pressure error positions. Such different pressure error positions may be desirable for various computational or readout devices.

In order to minimize the Mach number influence on the static pressure measurements, two factors are of primary importance. The ports should be kept away from the strut because the pressure changes due to change in Mach adjacent the strut are intense. The cause of the intense change is that the strut is an abrupt change in section of the probe. Next, the maximum angle of a tangent line on the corrugated (or wavy or undulating) wall surface with respect to the axis of the probe should be kept to a minimum. A nominal maximum angle is about 8° but can vary from about 3° to 12°. The abruptness of change in the probe cross section size is minimized. The radial positioning of the ports of each set of ports opening into one chamber on the probe barrel portion with respect to a longitudinal reference plane lying along the probe longitudinal axis is affected by the influence of angle of attack of the aircraft. The ports of each set can be placed radially around the probe so as to compensate for angle of attack pressure errors associated with the particular aircraft. Multiple ports at different radial locations are generally used to average the pressure measurement in each static pressure sensing chamber of the probe, and two to four ports are most common. The intersection of the port axes with the outer surface of the barrel for each separate set of ports will usually be on a common radial plane; however, in some instances the multiple ports in each set may be staggered. In those instances where the ports are staggered, different positive or negative corrections may be desirable and can thus be obtained. The ports are cylindrical openings formed through the wall of the tubular probe barrel portion. The axis of each port can be either normal to the outer surface of the probe or substantially at right angles to the longitudinal axis 15. However, the port axes of each set will normally intersect the longitudinal axis 15 at a common point and thus the ports of each set may be considered to be positioned at the same axial location with respect to a radial plane on the probe barrel.

Figure 6:
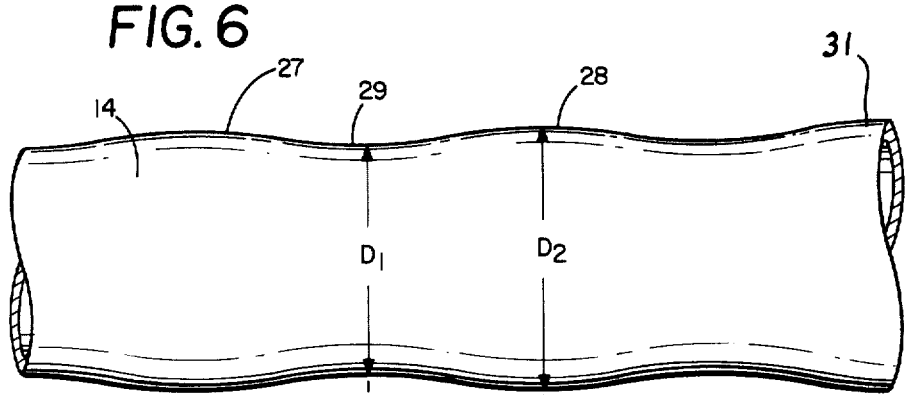
FIG. 6 is an enlarged top view of the center portion of the probe of FIG. 1.
Figure 7:
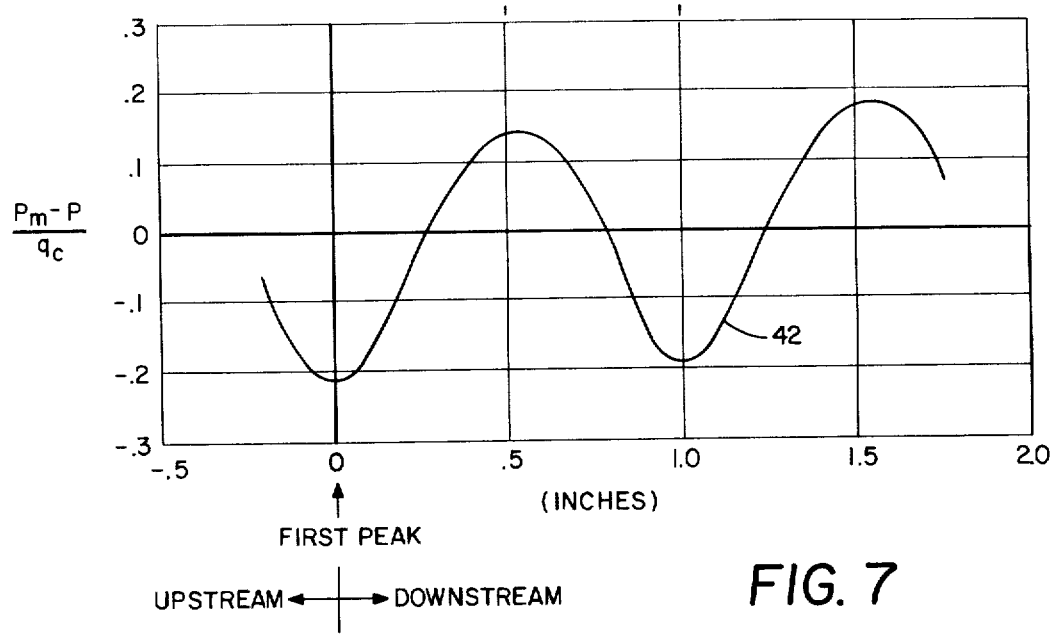
FIG. 7 is a graphical representation of the center portion of a curve in FIGS. 2 and 4 showing the actual normalized pressure curves on an enlarged scale for a probe made according to the present invention.

The graph of FIG. 7 is a larger sale representation of the center portion of the graph line 42 of FIG. 2 related to the corrugated wall portion of the probe. The numerals on the Y axis present the normalized pressure error, as shown in FIG. 2, and the numerals on the X axis represent the distance along the axis of the probe using the crest (maximum diameter) of the front annular corrugation as a zero or reference point. The scale of the X axis is enlarged, and actual test values are shown taken at Mach 0.5. The data shows large static pressure compensation levels available in both the positive and negative pressure regions. Corrugation amplitudes, expressed as $(D_2-D_1)/2$ (where $D_1$ and $D_2$ are located as shown on FIG. 6) can typically vary from 2% to 12% of $D_2$. The peak diameter $D_2$ can range typically from 0.7 inch to 0.9 inch but other diameters $D_2$ can also be functional. The diameter $D_2$ may be different from the diameter of the cylindrical surface section 31.

The normalized static pressure function $(p_m-p)/q_c$ is a standard term, and is provided to normalize the difference between the local static pressure and the measured static pressure. If there is no difference, this compensation function is zero. However, as shown, the positioning of the ports for chambers 22 and 34 may be such that there is a small known positive or negative pressure compensation which may be a preferred measurement in order to provide a predetermined compensating pressure function right at the source of measurement. This feature is important since, for example, if often eliminates the requirement for additional compensating devices at the pressure indicating instruments.

The term corrugation as used herein means at least one smooth wave between two generally equal size probe barrel sections. A corrugation may be a constriction, or may be a smooth annular hump or enlargement.

Although the present invention has been described with reference to preferred embodiments, workers skilled in the art will recognize that changes may be made in form and detail without departing from the spirit and scope of the invention.

What is claimed is:

1. In a probe for sensing static fluid pressures, said probe having a laterally extending mounting strut at a rear portion thereof for mounting said probe in spaced relationship to an external surface in a fluid flow stream and having a probe barrel with a longitudinal axis, the improvement comprising:

an annular smoothly curved corrugation formed on the outer surface of said barrel in a position between the leading end of said probe and the strut to form a pressure disturbance along said barrel and having substantially equal static pressure occurring at axially spaced positions on opposite sides of a radial plane lying on the minimum cross sectional dimension of said annular corrugation.

2. The apparatus of claim 1 wherein the corrugation comprises at least two annular constrictions and at least two maximum cross sectional dimensions adjacent to constrictions forming an annular wavy surface portion having two minimum cross sectional dimension portions, and pressure port means opening through the probe barrel at two axially spaced locations on the barrel surface portions on opposite sides of at least one of said constrictions.

3. The apparatus of claim 2 wherein said annular constrictions are axially spaced apart, and form a curved surface in cross section which has a tangent line along the curved surface not exceeding 12 degrees with respect to the probe longitudinal axis.

4. A static pressure measurement probe for providing pressure compensation to offset effects of adjacent structures, such as an aircraft fuselage, on local static pressure at the probe comprising:

a probe barrel having an elongated central longitudinal axis, and an outer surface that changes smoothly in cross section with both a reducing size portion and an increasing size portion to form a corrugation on a portion of the outer surface; and static pressure port means opening through said probe barrel adjacent said changes in cross section in at least two axially spaced locations on the outer surface which have a desired ratio of static pressure.

5. The apparatus of claim 4 wherein said change in cross section comprises a constriction formed relative to the adjacent barrel portions.

6. The apparatus of claim 5 wherein the outer surface of the probe barrel when viewed in longitudinal cross section passing through the longitudinal axis forms a smooth curve at the constriction.

7. The apparatus of claim 6 wherein a portion of the probe barrel is cylindrical and there are two annular maximum diameter sections on the surface having a smaller diameter annular section therebetween.

8. The apparatus of claim 7 wherein said static pressure sensing port means includes separate ports on opposite sides of a radial plane passing through the smaller diameter annular section and wherein the separate ports are located at points to give substantially equal measured pressures.

9. A fluid pressure sensing probe including an elongated barrel having first and second ends, means to mount said barrel at said second end to position the barrel with respect to a fluid stream, said barrel having a longitudinal axis and an outer surface comprising a surface of revolution around said axis, said barrel being subjected to a relatively moving fluid stream generally along the longitudinal axis, and the outer surface of said barrel comprising at least one annular corrugation having a bisecting plane between annular lines of different diameter, and at least two pressure sensing port means on said outer surface adjacent the bisecting plane of said annular corrugation and each pressure sensing port means being located at surface positions spaced along the longitudinal axis of the probe where the static pressure sensed is at a desired ratio between the respective pressure sensing port means.

10. The probe of claim 9 wherein the barrel has substantially equal diameter annular surface sections upstream from and downstream from the annular corrugation with respect to the relatively moving fluid stream.

11. The probe of claim 10 wherein said corrugation comprises an annular constriction between the substantially equal diameter annular surface sections of the barrel.

12. In a probe for sensing static fluid pressures, said probe having a laterally extending mounting strut at a rear portion thereof for mounting said probe in spaced relationship to an external surface in a fluid flow stream and having a probe barrel having a generally cylindrical surface portion and a longitudinal axis, the improvement comprising:
   at least two annular constrictions forming spaced corrugations on the outer surface of said barrel in position between the leading end of said probe and the strut to form a pressure disturbance along said barrel; and
   at least two sets of port means adjacent the corrugations and located axially on the probe where substantially equal static pressure occurs on opposite sides of at least one annular constriction.

13. The probe of claim 12 wherein one of the sets of port means is within the constriction which is nearest the leading end of the probe with respect to fluid flow, and the other set of port means is within the other constriction.

14. The probe of claim 12 wherein each of the sets of port means are located adjacent the minimum diameter of one of the two constructions, respectively.

15. A method of determining locations to place static pressure sensing ports on a probe having corrugations therein which provide an annular corrugated surface on the probe and provide substantial changes in static pressure from local static pressure of the fluid in which the probe is used, comprising providing a probe having sufficient corrugations to provide a pressure profile plotting the pressure profile on X-Y coordinates as a normalized pressure function along the Y axis with the axial distance of the probe being represented along the X axis and to have at least two negative pressure peaks and two positive pressure peaks, and drawing a horizontal line at a location where the horizontal line intersects at least four points on the profile on either the positive or negative side of the profile, and locating static pressure sensing port sets in at least two locations of substantially equal pressure on the probe selected by the intersections of the horizontal line with the profile.

* * * * *